United States Patent [19]

Larsson et al.

[11] Patent Number: 5,329,558
[45] Date of Patent: Jul. 12, 1994

[54] METHOD OF SYNCHRONIZING A RADIO RECEIVER WITH AN INCOMING RADIO SIGNAL

[75] Inventors: Lars G. Larsson, Stockholm; Jon K. Ugland, Sundryberg, both of Sweden; Alex K. Raith, Durham, N.C.

[73] Assignee: Telefonaktiebolaget L M Ericsson, Stockholm, Sweden

[21] Appl. No.: 866,853

[22] Filed: Apr. 10, 1992

[30] Foreign Application Priority Data

Apr. 12, 1991 [SE] Sweden ............................ 9101108-0

[51] Int. Cl.⁵ ............................................. H04L 07/00
[52] U.S. Cl. ..................................... 375/114; 375/106; 370/105.1; 370/105.4
[58] Field of Search ............................... 375/114, 106; 370/105.1, 105.4

[56] References Cited

U.S. PATENT DOCUMENTS

| | | |
|---|---|---|
| 4,112,498 | 9/1978 | Reiner et al. |
| 4,472,802 | 9/1984 | Pin et al. ................................ 370/108 |
| 5,195,108 | 3/1993 | Baum et al. ............................ 375/84 |
| 5,212,690 | 5/1993 | Löw ....................................... 375/114 |

FOREIGN PATENT DOCUMENTS

| | | |
|---|---|---|
| 0109332 | 5/1984 | European Pat. Off. |
| 0371357 | 6/1990 | European Pat. Off. |
| 8902844-3 | 4/1991 | Sweden . |
| WO88/05981 | 8/1988 | World Int. Prop. O. |

*Primary Examiner*—Stephen Chin
*Assistant Examiner*—T. Ghebretinsae
*Attorney, Agent, or Firm*—Burns, Doane, Swecker & Mathis

[57] ABSTRACT

A method of synchronizing a baseband demodulator in a radio receiver, which may be stationary or mobile. The demodulator is a phase-shift demodulator and detects a baseband signal incoming from a sampling A/D-converter in the receiver. The baseband signal is transmitted from a radio transmitter in the form of bursts, in time slots in accordance with the TDMA-principle. One time slot, in addition to the data word, also includes in a known manner a synchronization part which has a given, fixed bit pattern. Prior to demodulation in the baseband demodulator, differential correlation of the received baseband signal is effected with the known synchronization pattern, wherein a time-dependent correlation function is obtained. The absolute magnitude of the maximum value is calculated and the corresponding time position for this maximum value is detected, which denotes the time position of the synchronization part of the received baseband signal.

5 Claims, 2 Drawing Sheets

METHOD OF SYNCHRONIZING A RADIO RECEIVER WITH AN INCOMING RADIO SIGNAL

FIELD OF THE INVENTION

The present invention relates to a method of synchronizing a radio receiver with an incoming radio signal which is transmitted in the form of signal frames from a radio transmitter, where each frame includes a given number of time slots. More specifically, the invention relates to the synchronization of incoming radio signals when demodulating a baseband signal in the receiver of a radio station, by means of a fixed synchronizing word in each time slot.

BACKGROUND OF INVENTION

In a digital cellular radio system which operates in accordance with the TDMA-principle, radio messages are transmitted in frames from a radio transmitter, for instance a base station, each frame including a given number of time slots. In this respect, it is necessary to synchronize the radio receiver (the mobile) with the radio transmitter for the time slot intended for the radio receiver. This synchronization must be effected quickly and independently of the time dispersion of the radio medium due to multipath propagation and fading. Furthermore, synchronization must be effected independently of the frequency errors that can occur during radio transmission.

It is known to compensate for the time dispersion of the radio medium, by coherently correlating the received and demodulated radio signal; see for instance Swedish Patent Application 8902844-3 corresponding to U.S. Pat. No. 5,230,079. According to this patent application, the received and demodulated radio signal is coherently correlated with the intention of setting or adjusting an equalizer which functions to compensate for or to equalize the echoes that are obtained with multipath propagation. As described in the aforesaid patent application, and also in WO88/05981, each received time slot includes a synchronizing word which is used to activate and set the equalizer. The synchronizing word is used to enable the equalizer to carry out its function at the correct time position in relation to the time slots in the received radio signal. The equalizer is normally included in the demodulator for the baseband signal, which may be phase-shift modulated (QPSK) for instance. If no equalizer is included in the demodulator, the demodulator still requires synchronization signals in order to carry out its function.

SUMMARY OF THE INVENTION

The advantage afforded by coherent correlation of received radio signals is that it can be applied practically irrespective of the dispersion properties of the radio medium, i.e. even in the event of pronounced scattering of reflected and received radio signals. Coherent correlation of the incoming and demodulated radio signal gives an estimate of the impulse response of the radio channel to the time slot in which the synchronization word is found. The synchronization word is sometimes referred to as the "training sequence". This assumes, however, that a correction has been made for any frequency error that may have occurred during propagation of the radio signal from transmitter to receiver, as a result of doppler shift during radio transmission to a mobile receiver or due to deviation of the receiver synthesizing frequency from the transmission frequency. When a large frequency error occurs, the method which applies coherent correlation will not work. It is therefore necessary to detect the frequency error in the radio receiver and to compensate for this error before correlation can take place.

The present invention relates to another method of correlating the received radio signal, so-called differential correlation.

According to this method, the properties are utilized in the demodulation of the radio signal to form a differential signal between a detected symbol value and a nearest preceding or nearest following symbol value, partly in the received radio signal and partly in the known synchronization word, which is stored in the radio receiver. Subsequent to correlation, there is obtained a signal whose absolute value or absolute magnitude denotes a time position which is equal to the time position of the desired synchronization word.

BRIEF DESCRIPTION OF THE DRAWINGS

The invention will now be described in more detail with reference to the accompanying drawings, in which.

DETAILED DESCRIPTION OF THE PREFERRED EMBODIMENT

Figure 1:
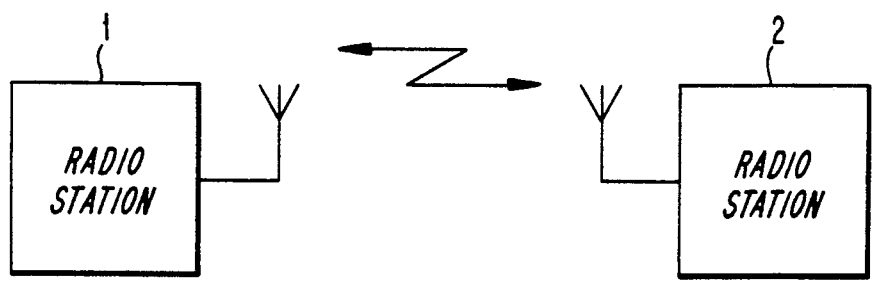
FIG. 1 illustrates schematically a radio transmitter and a radio receiver.

FIG. 1 illustrates generally two radio stations 1 and 2 which function to transmit and receive radio signals, i.e. the radio station 1 receives and detects radio signals transmitted from the radio station 2, and vice versa. The inventive method can be applied in both station 1 and station 2 in the reception of radio signals. In particular, radio station 1 may be a base station and radio station 2 may be one of a number of mobile stations.

The radio signals interchanged between station 1 and station 2 are radio-frequency, baseband-modulated signals which are time divided in accordance with the TDMA-principle. Transmission and reception over the radio channels is divided with a given duplex spacing in frames and time slots according to FIG. 2, such that one frame will have a given duration and includes, e.g., eight time slots, of which each has a duration of about 1 ms, when the frame duration is 8 ms. One of the radio channels, or a small number of said channels, is/are used to control and transmit general information to the mobile stations from the base stations in a coordinated fashion. Located in the centre of the data message D is a synchronization part $S_o$ which contains a synchronization pattern $S_o(i)$, where i denotes the number of symbols. The synchronization part $S_o$ may also be placed at the beginning of the data message D. The synchronization part has a bit pattern which is known in both the transmitter and receiver and which is the same for a given time slot in recurring frames, i.e. time slot CH2 has the same bit pattern in its synchronization word in the next following frames. The synchronization pattern $s_o(i)$ may also be used to synchronize the demodulator in the receiver part of a radio station, burst-by-burst in the time slots CH0-CH7, in addition to being used to estimate time dispersion.

Figure 2:
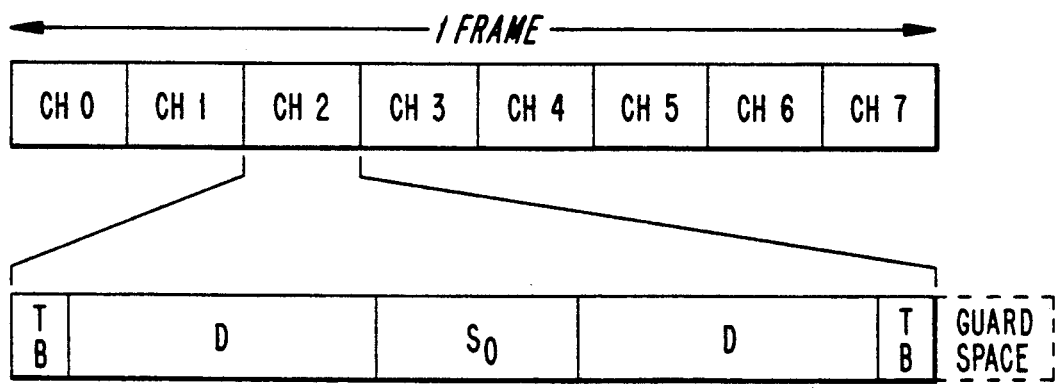
FIG. 2 illustrates a radio channel having eight time slots and shows schematically the content of one time slot when transmitting between the radio stations illustrated in FIG. 1.
Figure 3:
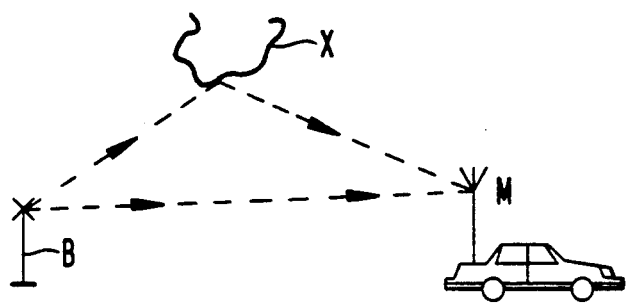
FIG. 3 illustrates multipath propagation.

In the case of the FIG. 3 embodiment, the radio station 1 is a base station B, and the radio station 2 is a mobile station M. The base station B transmits radio waves to the mobile station M in TDMA over a given channel, as illustrated in FIG. 2. Radio waves travelling in one direction are reflected by stationary or moveable obstacles, whereas other waves propagate freely to the mobile M, where they are received. The multipath propagation illustrated in FIG. 3 gives rise to fading, which may have different forms. If the time differences between received waves are concentrated to a time interval which is significantly shorter than the bit time, Tbit (see FIG. 4), so-called flat fading occurs. If the time differences are greater, two or more separated waves occur, each having more or less independent fading. This fading results in varying amplitude and phase upon reception. The receiver equalizer forces a coherent demodulator in the receiver to follow this phase change. The phase position can be determined unambiguously by transmitting a known sequence $s_o(i)$ in the aforesaid synchronization part $S_o$. If the channel does not vary too quickly, i.e. varies at a low bit speed, it is not necessary for the demodulator to update the information relating to the phase position of the received signal during the time of detecting the data message, although when the bit speed is high it is necessary to adjust the propagation parameters at the start of each time slot, and sometimes even during the duration of said time slot.

Figure 4:
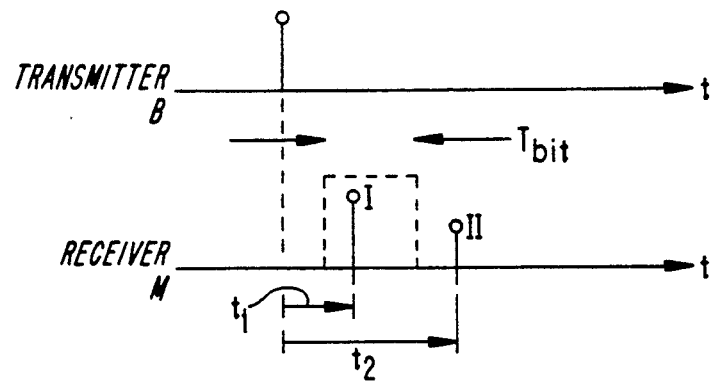
FIG. 4 illustrates time dispersion.

FIG. 4 illustrates the manner in which an impulse transmitted from the transmitter in base station B is received by the receiver M of the mobile as a result of the aforesaid fading. The impulse response obtained is comprised of two impulses I and II, of which I has been delayed by the time $t_1$, corresponding to the propagation time, and the impulse II is attenuated and further delayed by the time $t_2$, due to reflection against X in the FIG. 3 illustration. FIG. 4 is an imaginary case, which is intended merely to illustrate the principle. In reality, so-called intersymbol interference occurs in the receiver, i.e. the pulses I and II are interleaved. It has also been assumed that the impulse response is comprised only of two impulses. In reality, there is obtained an interference pattern which is comprised of a number of reflected impulses. FIG. 4 illustrates, so-called time dispersion, i.e. a transmitted impulse gives rise to a number of time-shifted impulses (in FIG. 4, only two impulses, namely the impulse I and II) , due to multiwave propagation. The bit time $T_{bit}$ is significant in this connection. In order for the channel to be considered free from time dispersion, the bit time $T_{bit}$ should be of such long duration that the significant pulse II will fall within the $T_{bit}$—interval i.e. $t_2-t_1 << T_{bit}$. The time dispersion can give rise to bit error, due to the aforesaid intersymbol interference. The influence of this time dispersion can be reduced, by using low symbol speeds, i.e. $T_{symbol}$ relatively large (speed<25 kband/s), or by using an equalizer.

If the aforedescribed time dispersion is such that reflected significant pulses II occur within a very limited interval $t_2-t_1$ (for instance 10 $\mu$s), it is not necessary to employ coherent correlation, which according to the above is due to frequency error of the radio signal received. According to the present invention, in this case so-called differential correlation is used instead, wherein simultaneous estimation of the frequency error is obtained. Since the frequency error can be estimated, it is possible to compensate for the error in the RF/IF-demodulator and then switch to coherent correlation, if necessary.

Figure 5:
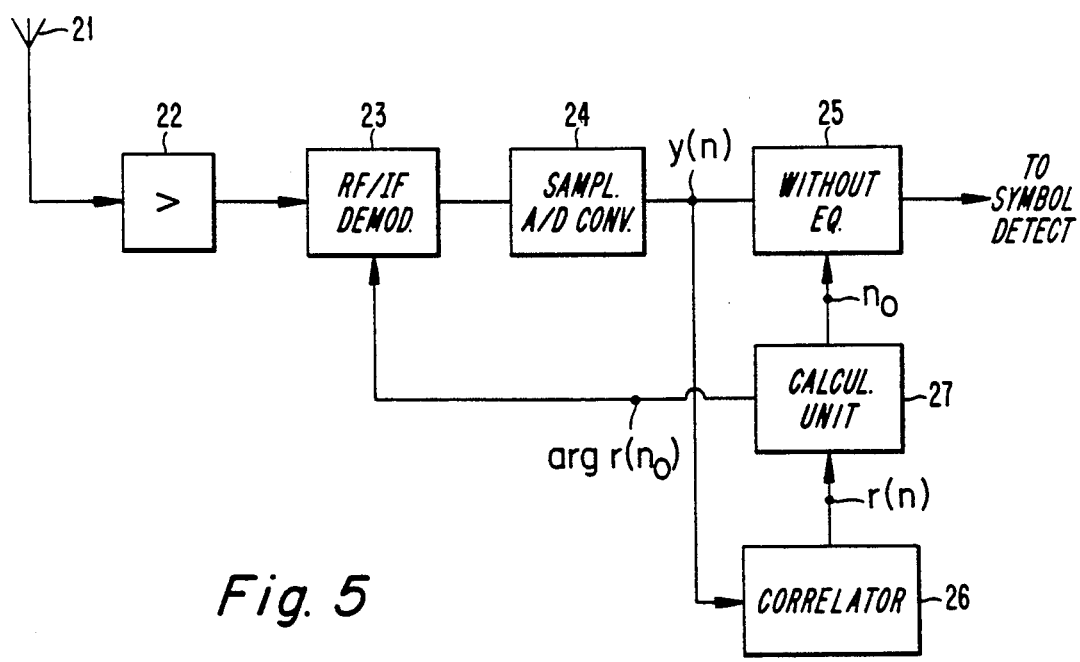
FIG. 5 is a block diagram which illustrates in more detail the receiving units of a radio station in which the inventive method is applied.

FIG. 5 illustrates in more detail the receiver part of the radio station 2 shown in FIG. 1, where the inventive method is applied.

The radio signal received from the receiver antenna 21 is transferred to an amplifying unit 22 and from there to an RF/IF-demodulator 23. There is obtained from the demodulator 23 a baseband signal which is an analogue signal and which represents transmitted data flow (data symbols) modulated in accordance with a given modulation program, for instance is phase-shift modulated QPSK (Quadrature Phase Shift Keying).

Sampling and analogue-digital conversion take place in the unit 24, and there is obtained a digital signal y(n) which represents a phase-shift modulated baseband signal and which is delivered to the following demodulator 25. In order for the demodulator 23 to effect correct demodulation, a synchronization signal is required or it is necessary to synchronize the demodulator with the phase-shift modulated baseband signal transmitted from the transmitter. Accordingly, the signal y(n) is delivered to a correlator which carries out a differential correlation between the received signal y(n) and the synchronization word with a known synchronization pattern $s_o(i)$ which is transmitted from the transmitter part of the radio station 1, in accordance with FIG. 1. The known synchronization pattern $s_o(i)$ is stored in the synchronization word generator of the receiver.

A corresponding signal s (i) is obtained from the known synchronization pattern and there is formed in the correlator 26 a differential signal $$\Delta_s(i) = s_o(i+1) s_{ohu} *(i)$$

where $s_o(i+1)$ is the (i+1):th symbol in the synchronization pattern $S_o(i)$, and $s_o^*(i)$ is the complex conjugate of $s_o(i)$. If it is assumed that $$S_o(i) = A_i \cdot e^{j\Theta_i}$$

then $s_o^*(i) = A_i \cdot E^{-j\Theta_i}$, where $A_i$ is the amplitude and $\Theta_i$ is the phase of the i:th symbol.

If $s_o(i + 1) = A_{i+1} \cdot e^{j\Theta_{i+1}}$ then
$\Delta s(i + 1) = A_i \cdot A_{i+1} \cdot e^{j(\Theta_{i+1}-\Theta_i)} = A_i \cdot A_{i+1} \cdot e^{j\Delta\Theta_i + 1}$ which means that $\Delta_s(i+1)$ represents the angular change that has occurred during modulation of $s_o(i)$, and $s_o(i+1) \cdot A_i$, $\Theta_i$ and $A_{i+1}$, $\Theta_{i+1}$ represent the signal points and $\Delta\Theta_{i+1}$ represents the angular change (positive, negative or zero) which has occurred in the phase-shift modulation (for instance QPSK).

In a similar manner, there is formed in the correlator 26 from the received signal y(n) a differential magnitude $$\Delta_y(i) = y(i) \, y^*(-u)$$

where $y^*(i-u)$ is the complex conjugate of $y(i-u)$ and u equals a sampling factor, which for the sake of simplicity can be said to equal 1.

The differential correlation is effected in the correlator 26, by forming $$r(n) = \frac{1}{L} \sum_{i=k}^{k+L-1} \Delta_s(i) \cdot \Delta_y^*(n+i)$$

when the sampling factor u=1, where L is the number of symbols in the synchronization part $S_o$ and k=0 when the whole of the synchronization part is used in the correlation. Greater precision is achieved when sampling the received and demodulated signal in the A/D converter 24, when the up-sampling factor u is chosen to be >1.

Thus, the differential correlation involves forming the product of the differential magnitude a $\Delta_s(i)$ from the known synchronization pattern $S_0(i)$ for each signal point (symbol) and forming the complex conjugate of the differential magnitude $\Delta y$ (n+i), where n denotes the time position for the sample of y(n) and i denotes the time position for a given symbol in the synchronization pattern $S_0(i)$.

The formed correlation function r(n) for each sample in the signal y(n) has an absolute maximum value $|r(n)|$ max for a given value of n, which denotes the desired time position for the synchronization pulse which is to activate the demodulator 25, i.e.

$$|r(n)|_{max} = r(n_o),$$

where $n_o$ denotes the time position of the synchronization pulse. There is also obtained from the function r(n) an estimation of the frequency error, by forming arg [r(n)]. More specifically, the following applies for the frequency error $\Delta f$ $$\Delta f = \arg[r(n_o)] \cdot \frac{1}{2\pi T_s}$$

where $n_o$ is the selected sampling time point and $T_s$ is the symbol time.

The correlator 26 is comprised of a signal processor of known kind, which is programmed to carry out the aforedescribed calculations. The calculating unit 27 effects the calculation of $|r(n)|max = r(n_o)$, and the calculation of arg $[r(n_o)]$ in a known manner from r(n).

The demodulator 25 in the receiver illustrated in FIG. 5 does not include an equalizer, and the sole purpose of the obtained synchronization signal $|r(n_o)|$ is to detect the correct signal point in the phase-shift modulated signal y(n). The value arg $[r(n_o)]$ is sent to the RF/IF demodulator, so that the demodulator is able to compensate for the frequency error $\Delta f$ in accordance with the above relationship. However, a further demodulator may be provided in the receiver according to FIG. 5 (not shown), as described and illustrated in the Swedish patent application mentioned in the introduction. It is therewith possible to engage the demodulator 25 in the absence of an equalizer, and to perform a differential correlation in order to compensate for the frequency error. The demodulator is then disconnected, or deactivated, and a demodulator which is provided with an equalizer is then engaged, wherein coherent correlation is carried out in a known manner.

We claim:

1. A method of synchronizing a baseband demodulator in a radio receiver with a synchronization part (s(i)) of a sampled baseband signal (y(n)) arriving at the demodulator, said sample baseband signal being transmitted from a radio transmitter over a radio medium in the form of bursts, each of which occupies a given time slot included in a number of time slots within a frame, wherein the radio medium exhibits time dispersion with limited spread of delayed signals to received radio signal and wherein each of the tim slots includes a data apart and a synchronization part which includes a known bit patterns ($s_o(i)$), comprising the steps of forming a time-dependent correlation signal (r(n)) by carrying out in the radio receiver differential correlation of the received baseband signal (y(n)) with the know synchronization pattern ($s_0(i)$), and determining a time position ($n_o$) of an extreme value of the time-dependent correlation signal (r(n)), a time position of said synchronization part of the received signal (y(n)) being the time position ($n_o$) of the extreme value.

2. A method according to claim 1, further including the steps of deriving said extreme value of the time-dependent correlation signal by calculating the absolute value of the time-dependent correlation signal and determining the maximum of the calculate absolute value.

3. A method according to claim 1, wherein the step of forming the time-dependent correlation signal further includes the steps of:

a) forming from the know synchronization patters ($s_0(i)$) the differential magnitude
$_s(i) = S_0(i+i) \cdot S_o^*(i)$, where $S_o^I(i)$ denotes the complex conjugate of $S_o(i)$;

b) forming from the received signal y(n) a corresponding differential magnitude
$\Delta_y(i) = (i) \cdot y^*(i-u)$, where $y^*$ is the complex conjugate of y(i) and u is an up-sampling factor; and c) correlating the two differential magnitudes $\Delta_s(i)$ and $\Delta_y(i)$ by forming the time-dependent correlation function according to $$r(n) = \frac{1}{L} \sum_{i=k}^{k+L-1} \Delta_s(i) \cdot \Delta_y^*(n + i \cdot u)$$

4. A method of calculating a frequency error in a sampled baseband signal arriving at a radio receiver, said baseband signal being transmitted from a radio transmitter over a radio medium in the form of bursts, each of which occupies a given time slot in a number of time slots within a frame, wherein the radio medium exhibits time dispersion with limited spread of delayed signals to the received radio signal, and wherein each of the time slots includes a data part and a synchronization part which includes a known, fixed bit pattern, comprising the steps of forming a time-dependent correlation signal (r(n)) by carrying out differential correlation of the received baseband signal with the know synchronization pattern in the radio receiver, determining a time position of an extreme value of the time-dependent correlation signal, calculating a complex argument of the time-dependent correlation signal for the time position of the extreme value, and estimating the frequency error with respect to a sampling rate of the baseband signal received in the radio receiver from the complex argument.

5. A method for synchronizing a radio reciver with a radio signal transmitted form a radio transmitter, said method comprising the steps of:
receiving a baseband signal in a plurality of time slots in a frame, each of said time slots including a synchronization portion with a known bit pattern and a data portion;
correlating said baseband signal with a known synchronization pattern to form a differential signal; and
detecting a time position of said synchronization portion of the baseband signal form a magnitude of said differential signal.

* * * * *